No. 844,583. PATENTED FEB. 19, 1907.
B. L. DIXON.
APPARATUS FOR CURING TOBACCO.
APPLICATION FILED OCT. 13, 1906.

2 SHEETS—SHEET 1.

Witnesses
G. R. Thomas
K. G. Whitcomb

Inventor
B. L. Dixon
By Swift & Co.
Attorneys

No. 844,583. PATENTED FEB. 19, 1907.
B. L. DIXON.
APPARATUS FOR CURING TOBACCO.
APPLICATION FILED OCT. 13, 1906.

2 SHEETS—SHEET 2.

Witnesses
G. R. Thomas
K. G. Whitcomb

Inventor
B. L. Dixon
By Swift &c.
Attorneys

UNITED STATES PATENT OFFICE.

BENJAMIN LEWIS DIXON, OF GEORGETOWN, KENTUCKY, ASSIGNOR OF ONE-HALF TO G. H. WATTS, OF GEORGETOWN, KENTUCKY.

APPARATUS FOR CURING TOBACCO.

No. 844,583.     Specification of Letters Patent.     Patented Feb. 19, 1907.

Application filed October 13, 1906. Serial No. 338,808.

*To all whom it may concern:*

Be it known that I, BENJAMIN LEWIS DIXON, a citizen of the United States, residing at Georgetown, in the county of Scott and State of Kentucky, have invented a new and useful Apparatus for Curing Tobacco; and I do hereby declare the following to be a full, clear, and exact description of the invention, such as will enable others skilled in the art to which it appertains to make and use the same.

The invention relates to an apparatus for curing tobacco, and has for its object to provide an exceedingly simple, inexpensive, and durable device of this character adapted to contain a fire and which can be safely and conveniently placed in a building or tobacco-barn and which can be readily carried therein.

With these and other objects in view the invention consists in the construction and novel arrangement of parts hereinafter described and shown, and particularly pointed out in the appended claims.

Figure 1:
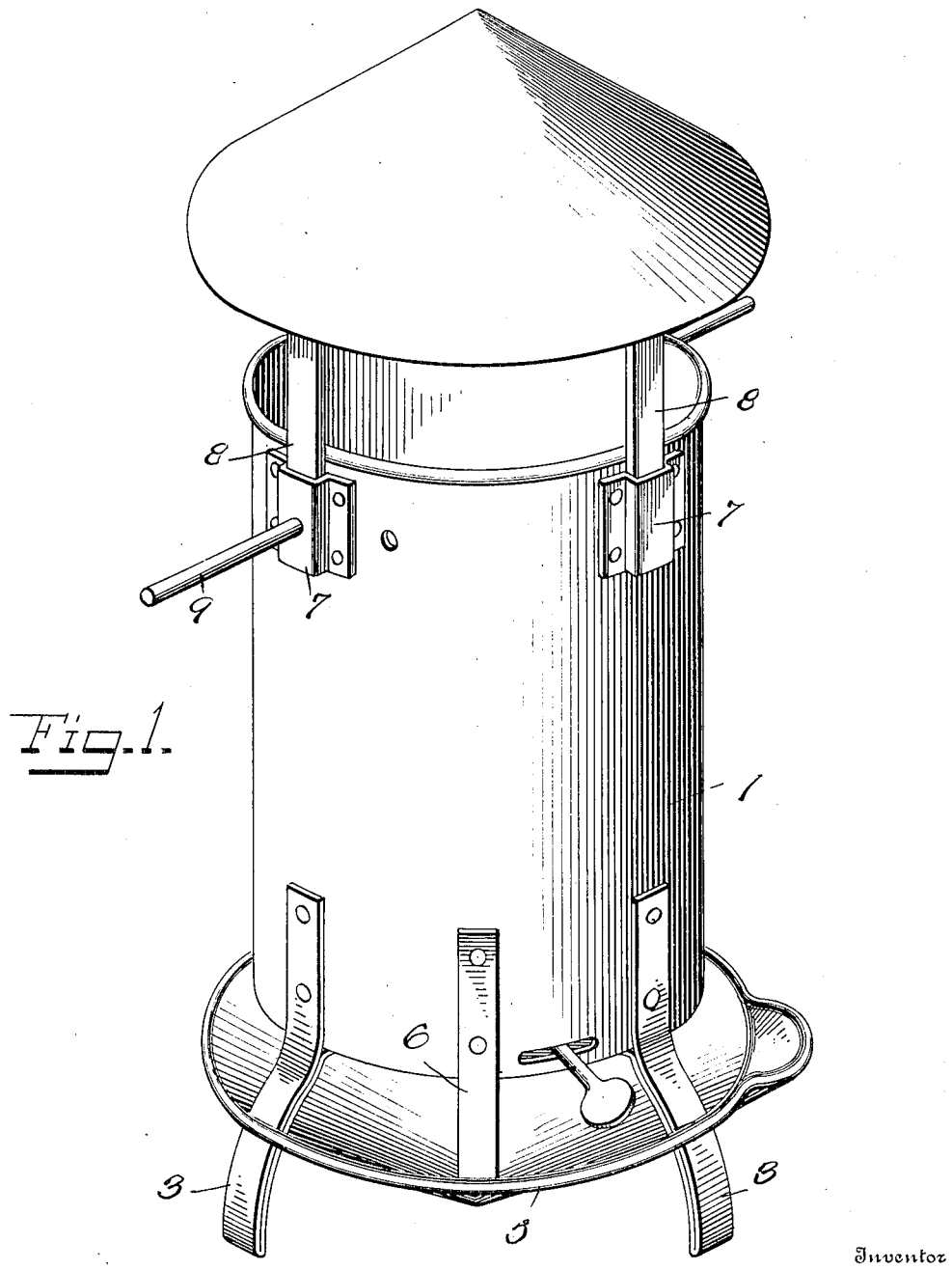
Figures 2, 3:
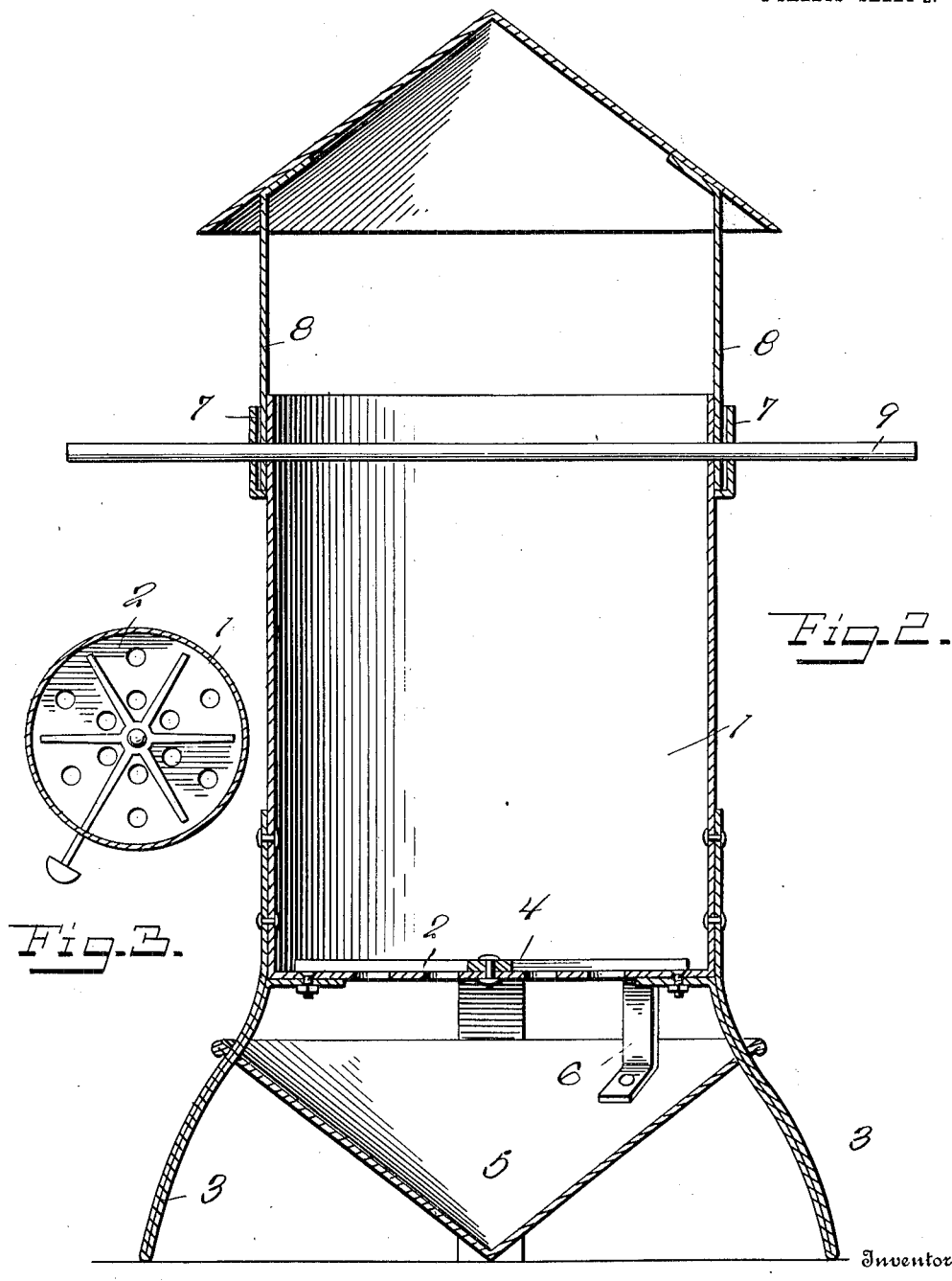

In the drawings forming part of this specification, and in which like numerals of reference designate corresponding parts, Figure 1 is a perspective view of the tobacco-curing apparatus constructed in accordance with this invention. Fig. 2 is a vertical sectional view.

Referring to the drawings, 1 designates the body of the apparatus, which is of cylindrical shape, as shown, and which is provided with a perforated bottom 2, supported by legs 3. The interior of the body or cylinder 1 is provided with a shaker 4, which is adapted to shake the ashes and cause them to fall through the perforated bottom into the cone-shaped pan 5. The pan 5 is connected with the body 1 by means of arms 6 and is further braced by the outwardly-spreading legs 3, which pass through slots in the periphery of the pan. As stated, the pan 5 is cone-shaped, by which the ashes falling therein will gravitate toward the center thereof.

The upper portion of the cylinder is provided with pockets 7 for the reception of arms 8, connected with the cone-shaped top of the device. The cone-shaped top is considerably larger in diameter than the cylinder or body of the device, for the purpose of causing the heat to spread in all directions as it emanates from the fire. This device can be easily carried from place to place by means of a rod 9, which is inserted in apertures in the upper part of the body 1. The rod 9 passes through the pockets 7 and the arms 8, by which the top is locked in its position. The rod 9 can be inserted in other apertures for carrying the device around should it be inadvisable to use it as locking means.

What I claim is—

1. A portable apparatus of the class described comprising a cylinder, adapted to contain a fire, said cylinder having a perforated bottom, a shaker arranged on the top thereof, and a cone-shaped pan arranged beneath said cylinder, and spaced therefrom.

2. A portable apparatus of the class described, comprising a cylindrical body, a perforated bottom, a cone-shaped ash-pan, connected with the cylinder and spaced therefrom, and having slots in its periphery, and outwardly-spreading legs, supporting the body of the apparatus, and passing through said slots.

In testimony whereof I have signed my name to this specification in the presence of two subscribing witnesses.

BENJAMIN LEWIS DIXON.

Witnesses:
    E. B. YATES,
    JNO. S. GAINES.